United States Patent [19]
Kongelbeck

[11] 3,872,776
[45] Mar. 25, 1975

[54] MISSILE LAUNCHER

[75] Inventor: Sverre Kongelbeck, Silver Spring, Md.

[73] Assignee: The United States of America as represented by the Secretary of the Navy, Washington, D.C.

[22] Filed: May 4, 1973

[21] Appl. No.: 357,137

Related U.S. Application Data

[62] Division of Ser. No. 97,686, Dec. 14, 1970, Pat. No. 3,742,813.

[52] U.S. Cl. ................................. 92/12, 188/316
[51] Int. Cl. ........................................ F15b 15/22
[58] Field of Search ............ 92/8, 10, 12, 85, 9, 11; 188/316

[56] References Cited
UNITED STATES PATENTS

| | | | |
|---|---|---|---|
| 701,265 | 5/1902 | Harriman | 92/9 X |
| 756,831 | 4/1904 | Clarke | 92/8 X |
| 2,605,751 | 8/1952 | Perry et al. | 92/11 X |
| 2,838,140 | 6/1958 | Rasmusson et al. | 92/9 X |
| 2,991,760 | 7/1961 | Rhine | 92/11 X |
| 3,193,988 | 7/1965 | Kvdlaty | 92/8 X |
| 3,418,768 | 12/1968 | Cardan | 188/316 X |

FOREIGN PATENTS OR APPLICATIONS

| | | | |
|---|---|---|---|
| 944,631 | 12/1963 | United Kingdom | 92/10 |

*Primary Examiner*—Martin P. Schwadron
*Assistant Examiner*—Abraham Hershkovitz

[57] ABSTRACT

The invention relates to actuator mechanisms and particularly provides a shock-absorbing actuator apparatus comprised of an actuator piston buffered by liquid metered within a chamber of fixed volume. In a preferred structure of the invention, gas is externally metered against a first actuator piston in a chamber, this piston and chamber being independent of a buffer piston disposed within the first-mentioned chamber. The first-mentioned chamber has a liquid disposed therein which is internally metered about the buffer piston to cushion shock on the actuator structure.

1 Claim, 1 Drawing Figure

MISSILE LAUNCHER

CROSS-REFERENCE TO RELATED APPLICATION

This is a division of application Serial No. 97,686, filed on December 14, 1970, now U.S. Pat. 3,742,813.

BACKGROUND AND SUMMARY OF THE INVENTION

The invention relates to actuator mechanisms and particularly comprises a shock-absorbing actuator apparatus comprised of two separate chambers, a first chamber having a first actuator piston therein which has gas metered thereagainst. An independent second chamber has a buffer piston and a liquid therein, the liquid being internally metered about the buffer piston to cushion shock on the actuator structure.

Accordingly, it is an object of the invention to provide a shock-absorbing actuator apparatus having an internal buffering capability for cushioning the movement of an actuator piston within the apparatus.

DESCRIPTION OF THE PREFERRED EMBODIMENTS

Figure 1:
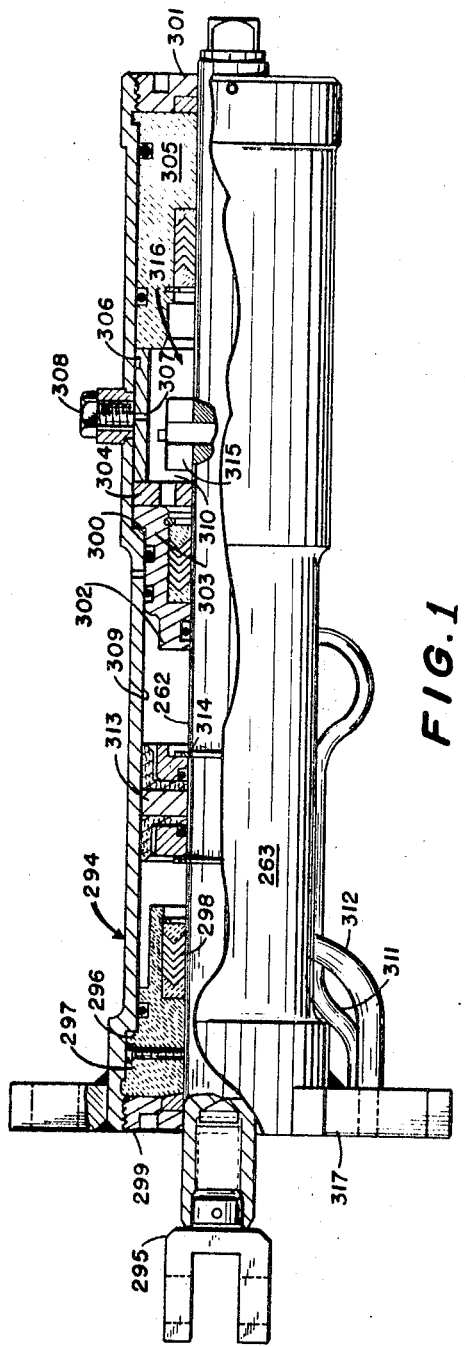
FIG. 1 is an enlarged longitudinal section, partly in elevation, showing the internal structure of the present actuator apparatus.

The actuator 263 per se is shown in FIG. 1. The cylinder is indicated at 294 and receives a piston rod 262 therein. As will be seen, the piston rod extends throughout the length of the cylinder and beyond the forward and aft ends thereof. At its forward end the piston rod 262 carries a clevis 295 which is suitably secured to said rod.

The cylinder 294 is provided with an enlarged forward end portion which defines a shoulder 296. A forward bearing 297 surrounds the piston rod 262 within the enlarged forward end portion and bears against the shoulder 296, the forward bearing having packing rings 298 and being held in place by a forward end plug 299 which is screwed into said forward end portion.

The cylinder 294 is enlarged throughout the aft one-half of its length, the enlarged aft section defining an internal shoulder 300 and the aft end portion of said section being slightly further enlarged and internally threaded to receive an aft end plug 301.

Mounted in the cylinder 294 and surrounding the piston rod 262 is a separator ring 302. The separator ring has a flange 303, which bears against the shoulder 300, and suitable packing and seals to prevent leakage along the piston rod or between said ring 302 and the inner wall of the cylinder. A stop ring 304 retains the separator ring 302 in place.

Secured in the aft end portion of the cylinder 294, and retained in place by the aft end plug 301, is an elongated aft bearing 305, and disposed between the forward end of said aft bearing and the stop ring 304, and in engagement with the inner wall of the cylinder is a spacer sleeve 306. The spacer sleeve is provided with an opening 307 which is located beneath a filler plug 308.

It will be seen from the foregoing that the separator ring 302 divides the interior of the cylinder 294 into fore and aft chambers, hereinafter called an air chamber 309 and a buffer chamber 310. High pressure air is introduced to one end or the other of the air chamber 309 by pipes 311 and 312. The buffer chamber 310 is filled with a liquid of appropriate viscosity and sealed. An actuator piston 313 is fitted on the piston rod 262, as by snap rings 314, within the air chamber 309, and a buffer piston 315 is secured to said rod 262 within the buffer chamber 310. As will be seen in FIG. 1, the buffer piston is of smaller diameter than the spacer sleeve 306, thus to define a liquid passage between said piston and said sleeve, the piston, the sleeve and the liquid in the buffer chamber 310 defining a buffer 316.

A mounting flange 317 is provided at the forward end of the actuator 263 to permit mounting of the structure. In operation, air is admitted to the forward end of the air chamber 309 and acts on the actuator piston 313 for stressing the piston rod 262 toward the aft end of the cylinder 294. Shock caused by sudden release of any apparatus (not shown) such as would be attached to the clevis 295 and which results in an abrupt aft movement of the rod 262 is buffered by the buffer 316. Movement of the piston rod 262 by the actuator piston 313 moves the buffer piston 315. Movement of the buffer piston 315 and the rod 262 will be retarded by the action of the liquid as it flows in the buffer chamber 310 from one side of said buffer piston to the other side thereof. High pressure air acting on the aft face of the actuator piston 313 moves the piston rod 262 in the opposite direction. The buffer 316 also acts in this situation to cushion movement of the rod 262.

What is claimed is:

1. An actuator comprising:
   a cylindrical housing;
   a piston rod movable in the cylindrical housing;
   forward and aft bearings at respective ends of the cylindrical housing for holding the piston rod in a substantially axial position within said housing, each of the forward and aft bearings having a central aperture therein through which the piston rod extends externally of the housing, said aft bearing being positioned within said cylindrical housing;
   a separator ring abutting a portion of the cylindrical housing substantially medially of its length for separating the housing into first and second chambers, the chambers being sealed from each other, the piston rod extending axially through a central aperture in the separator ring;
   a liquid of predetermined viscosity in the second chamber;
   an actuator piston on the piston rod and disposed within the first chamber;
   a buffer piston on the piston rod and disposed within the second chamber; a spacer sleeve within the second chamber and extending between the separator ring and the aft bearing and in abutting engagement therewith, the spacer sleeve being substantially cylindrical in conformation and being of a smaller diameter than the cylindrical housing, and the buffer piston being of a smaller diameter than the sleeve, a reduced liquid passage being defined between the interior surface of the sleeve and the buffer piston;
   closer means secured to said housing for holding said aft bearing, spacer sleeve, and separator ring in assembled position; and,
   means for introducing gas under pressure into the first chamber at one side or the other of the actuator piston, movement of the piston rod by action of gas acting on the actuator piston acting to displace the buffer piston within the second chamber, thereby causing the liquid in said second chamber to flow in the reduced liquid passage between the sleeve and the buffer piston for effecting a buffering action on the piston rod.

* * * * *